Nov. 26, 1940.  G. L. ROBERTSON ET AL  2,222,856
FLUSH VALVE FOR WATER CLOSETS AND THE LIKE
Filed Sept. 22, 1939  2 Sheets-Sheet 1
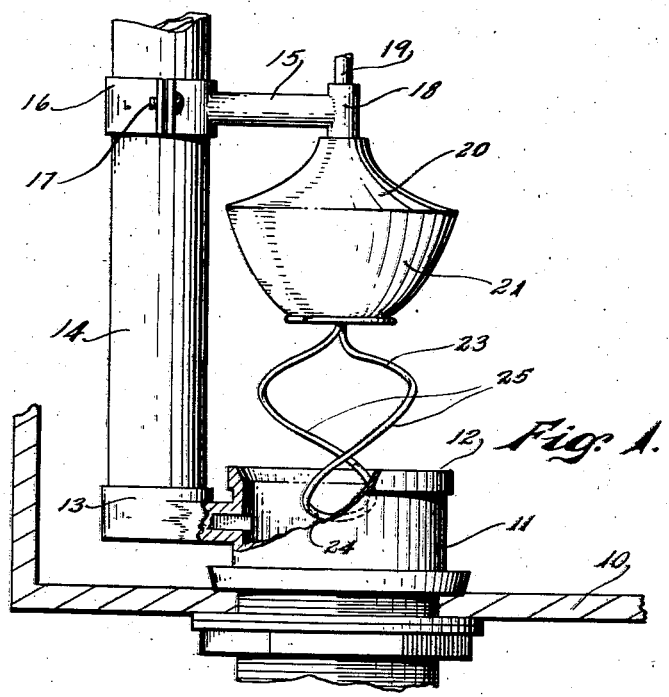
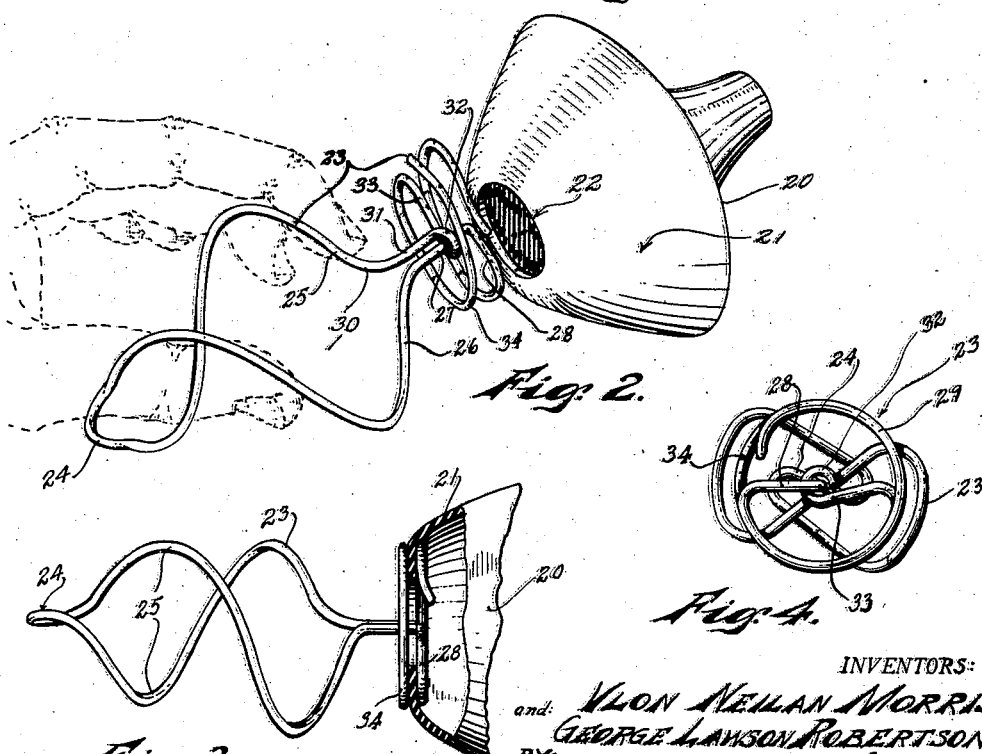
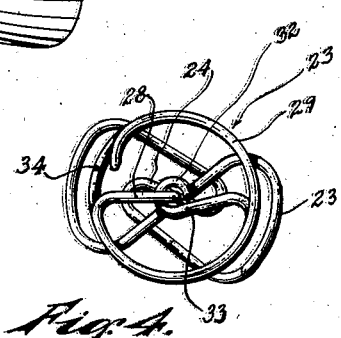
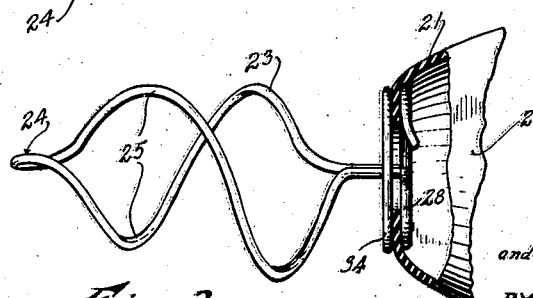
INVENTORS:
VLON NEILAN MORRIS,
and GEORGE LAWSON ROBERTSON,
BY Christian L. Nielsen
ATTORNEY.

Nov. 26, 1940.  G. L. ROBERTSON ET AL  2,222,856

FLUSH VALVE FOR WATER CLOSETS AND THE LIKE

Filed Sept. 22, 1939   2 Sheets-Sheet 2

INVENTORS:
VLON NEILAN MORRIS,
and: GEORGE LAWSON ROBERTSON,
BY: Christian L. Nielsen
ATTORNEY.

Patented Nov. 26, 1940

2,222,856

UNITED STATES PATENT OFFICE 2,222,856

FLUSH VALVE FOR WATER CLOSETS AND THE LIKE

George Lawson Robertson and Vlon Neilan Morris, Philadelphia, Pa., assignors to National Hydrolator Company, Inc., Philadelphia, Pa.

Application September 22, 1939, Serial No. 296,134

4 Claims. (Cl. 4—56)

The invention relates to flush valves for water closets and the like, and particularly to an attachable guide and seating device for various forms of such valves now commonly used.

It is well understood that on account of the loose movement which the stem of the rubber flush valve must have in order to permit its free movement, the usual air-filled rubber valve when released from its seat in a body of tank water, floats upwardly from its seat, and due to the necessary loose movement the valve can swing considerably to one side or the other, both when opening and when closing. The result is that these valves often fail to seat properly, tending to shift to one side or the other of the proper concentric relation which would assure maximum efficiency and satisfactory service.

Many efforts have been made to overcome the defects in the valve balls of this character, by guiding or otherwise aiding the valve to find its centered position. Examples of such devices are shown in the patents to Smith, No. 1,632,631; Shesler, No. 2,139,862; and Heath, 1,997,728.

Flush valves as commonly made include an upper stiff portion adapted to receive a threaded rectilinear coaxial stem, and a lower hollow rubber shell with an opening at the bottom, this lower shell portion usually being quite flexible in order that it may adapt itself to the shape of the seat and effect a watertight seal by the pressure of a column of water upon the top of the valve. These valves vary greatly in shape, while having the common features outlined, and being either semi-spherical or conical at the lower sides with comparatively smooth surfaces. The opening mentioned varies greatly in size in different valves, but is either rather large (one-half to one inch in diameter) or quite small (about one-eighth inch) in the valves commonly used.

It is an important aim of the invention to present an attachable device mountable upon the edge portion of such opening as mentioned, in the lower part of the valve of the general type named, regardless of the size of the openings or the shapes and construction of the valves otherwise. It is also an important aim to provide a novel means for causing rotary movement of the valve when moving to its seat, in order that the valve may more readily find its centered position, and at the same time clean the surfaces of the valve and seat, and prevent the valve from seating repeatedly in one position in its rotary movement.

Another important object is to provide a guide device of the general character indicated which will prevent the valve from swinging laterally from its seat, thus insuring that the guide device will positively engage in the discharge port, and also assuring free vertical movement of the stem of the valve in the standard guide on the overflow pipe.

Another important aim of the invention is in one form to effect a compound compression of the valve upon its seat, which will include the effect of the column of water over the valve, and in addition, a pneumatic pressure acting within the ball of the valve.

As is generally understood, the guide for the stem of such valves must be placed at a height above the valve seat which will permit the valve to rise above the influence of the vortex which forms with the out-rush of water from the tank, so that the valve will not be drawn back to its seat immediately when raised and released, and in many instances, this results in the valve remaining open longer than is necessary for adequate flushing operation. It is therefore an aim of our invention to enable the user to cause earlier seating of the valve by the weight of our appliance, if so desired. It is also an aim of our invention to present such a device which may be applicable to valves having extremely thin lower wall portions, and enable such valves to function with greater dependability than heretofore, preventing the wrinkling of the extremely thin walls, especially where large openings are formed therein.

Additional objects, advantages and features of invention reside in the construction and combination of parts involved in the embodiment of the invention, as will be understood from the following description and accompanying drawings, wherein Figure 1 is an elevational view of an installation of our invention in a conventional flush tank installation.

Figure 2 is a perspective view of the attachable device and the valve, separate and in position for initial application of our device to the valve.

Figure 3 is a fragmentary sectional view of the valve with our device attached thereto.

Figure 4 is a top view of our attachable device as shown in the first three figures.

Figure 5:
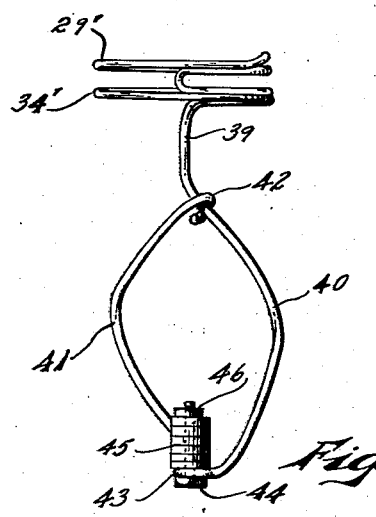
Figure 5 is an elevational view of a modification of the attachment.

There is illustrated a portion of a common flush tank 10, in which a water discharge port fitting 11 is installed in a familiar way, consisting of a simple tubular body having an annular seat portion 12 formed at its upper end exposed within the tank, and extending for a short distance upwardly within the tank, in accordance with common practice. This fitting 11 also includes a lateral extension 13, in which the usual overflow tank 14 is engaged, the extension 12 having a duct therethrough communicating with the interior of the fitting 11 below the seat 12, for the uses well understood in the plumbing art. At a distance above the fitting 11 the stem guide 15 is attached, vertically adjustable by the clamp device 16 which forms its base and including the tightening screws 17. The guide includes a vertically bored short sleeve 18, in which there is slidable the rectilinear stem 19 of a common rubber ball-valve 20, commonly engaged removably on the lower end of the stem by means of threads, not shown.

The lower thin walls of this ball valve 20 are of substantially parabolic form in its present instance, combining the advantages of the spherical surfaces and a conical surface, the extreme lower portion of the ball nearly semi-spherical and having a large opening 22 therein.

Our guide device may be formed of various materials and in various shapes, but in the preferred embodiment, for economy, both as to material and in processes of manufacture, it is formed of one piece of wire, preferably of a non-corrosive metal, a good spring brass having heretofore been used. In forming this device, we commonly take a portion of wire of the proper length, and at the middle thereof the wire is bent to form a short curve, over an arc of approximately 120° and with a radius of approximately half an inch. This forms the extreme lower end of the guide device and from its end spring integral, vermiform spiral arms 25 of the same pitch and direction, their radius gradually increasing to a maximum at a high point on the arms. These arms comprise the integral end portion of the wire extending from the bight 24, and from their points of major radius, they are curved abruptly inward, one end portion 26 being bent outwardly and extended rectilinearly on the axis of the arrow, for a short distance—approximately half an inch, in the present instance—forming a stem 27. At the outer end of this stem the wire is bent sharply at right angles and extended radially a suitable distance, then is bent to form a ring 29, concentric with the stem, the extremity of the wire stopping close to the radial portion 28. The other end portion of the wire is bent inwardly at 30 from its respective arm 25, and extended parallel to the stem 27 a short distance, preferably slightly more than the length of the stem 27. This helix is then axially compressed, and an eye 32 formed in this part of the wire, encircling the stem 27 loosely, the inherent resilience of the compressed helix then tending to thrust the eye outwardly against the radial arm 28 of the other end portion of the wire. From the eye 32, a radial arm 33 is extended for about the same length as the arm 28, and an inner ring 34 formed at the extremity of this end portion of the wire, also concentric with the stem 27 and of the same radius as the ring 29. The two rings are so arranged relatively to their inner supporting parts that when the device is free the two rings will be yieldingly pressed together by the expansion of the helical arm 25 carrying the inner ring.

In the use of the device as described, the valve 20 may be removed from the stem for placement of the device, or the device may be engaged with the valve while the latter is still mounted upon its stem 19 in operative position in the tank. The arm 25 carrying the ring 34 is longitudinally compressed to clear the two rings, and the extremity of the ring 29 is then entered in the opening 22 and the whole device rotated so as to project the end of the ring 29 into the opening 22 until the entire ring is encompassed within the ball 20. The device is then moved to a position with the axis of the two helical arms as nearly as possible coincident with the axis of the ball and the stem 19, and the compressed arm 25 then released, so that the ring 34 is pressed outwardly against the outer face of the lip portion of the ball around the opening 22, clamping this lip portion between the two rings, the ring 34 engaging against the inner surface of the lip portion of the ball. The ball will then be in, or may be placed in this operative position, with the guide device 23 approximately in the position illustrated in Figure 1, when it will function properly to guide the ball 20 to a proper seat when the ball moves downwardly.

It is obvious that this form of the invention can be attached to any tank ball, regardless of the size of the opening in the bottom of the latter.

When the tank is filled with water, and the valve is operated for flushing, by lifting in any of the usual ways, its buoyancy wil cause it to rise until checked by guide 15, where it will remain while the water is passing through the port fitting 11. In this movement, the water passing longitudinally with respect to the arms 25 will exert a force tending to rotate the device and the valve 20, so that when the water level falls sufficiently to permit the valve to move downwardly toward its seat, it will have a very material movement of rotation upon its vertical axis, and will effect a wiping action upon the seat as it engages thereon. This movement will also facilitate adjustment of the valve properly for accurate fit to the seat, and cause the valve to come to different positions in its rotary movement on the seat at each operation, so that tendency of the valve to become distorted in one part if the guide sleeve 18 should be slightly off center, is obviated.

The weight of the device will tend to cause the valve to seat earlier than the valve would ordinarily do without our appliance thereon, and any compensation required may be effected by adjusting the clamp device 16 upwardly or downwardly on the overflow pipe 14, as will be understood.

Experience indicates that compensation is but very seldom necessary. Hence, the usual result of the use of the device is a saving in water of one-half gallon or more per flush, without any sacrifice in sanitation.

In Figure 5 there is shown a modification of the device in which two clamping rings 29' and 34' are formed integrally on one end portion of the wire, these being shown separated although in practice, they would come approximately into contact, and they may be engaged in the valve in the same way as previously described. The end portion of wire of which these are formed constitutes a single helix 40, while the other end portion of the wire is much shorter and is formed as a similar helix 41, the extremity of which is engaged with the upper extremity of the helix 40 by an eye 42. At the junction of these two helices at their lower part an eye 43 is formed, in which a bolt 44 is engaged, and on which a number of weight washers 45 are removably engaged, held by a small nut 46 at the upper end of the bolt. This feature may be incorporated in the first described form of the device, if desired, and enables the adjustment of the weight of the article so as to regulate the amount of water passed at each flushing of the tank.

Figure 7:
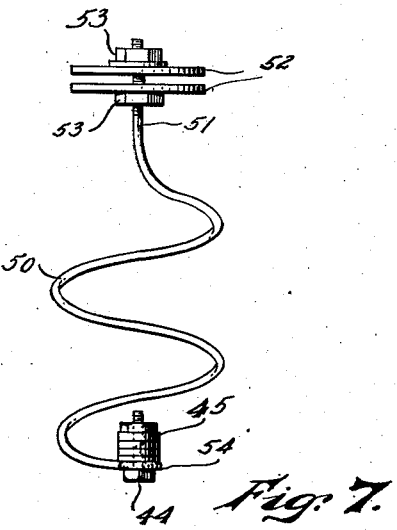
Figure 7 is a side view of a further modification.
Figure 6:
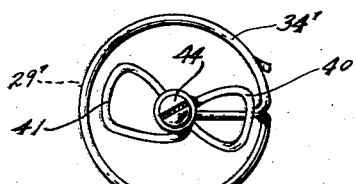
Figure 6 is a bottom view thereof.

Figure 7 shows a construction in which a single spiral 50 is formed, the upper end of the wire terminating in a stem 51 on which two washers 52 are adjustable and adapted to be compressed upon intervening valve lip portion by means of the nut 53 engaged on the threaded end portion of the stem 51. The lower part of the extremity of the wire forming the terminal end of the helix is formed with an eye 54, in which a bolt 44 is mounted to carry washers 45, as in Figure 5.

In case of a tank ball having only a very small opening (i. e. one-eighth inch in diameter) the two washers 52 are both left outside the ball, two units are used at 53 and attachment is made by stretching the rubber opening until one unit only is inserted in the ball, while the other nut is screwed up so as to help clamp the rubber. The principle of this method of attachment is illustrated in Figure 9, although small washers as well as nuts are shown in that figure.

Figure 8:
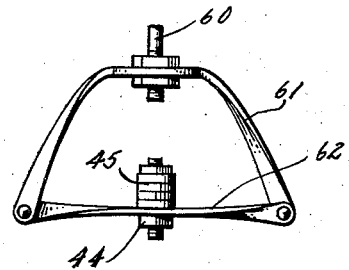
Figure 8 is an elevation of a still further modification.

Figure 8 illustrates a further modification in which an auxiliary stem portion 60 is provided, corresponding to the stem 51 above described, or corresponding to the stem 39 of Figure 5, and which may have either the clamping devices of Figure 7 or those of Figure 5 incorporated thereon. On the lower extremity of the stem 60, a bow-shaped rotor 61 is mounted, stamped from sheet metal and having oppositely extending downwardly bent arms twisted so as to impart a rotary movement to the valve upon which the device is mounted, the extremities of these arms being connected by a cross bar 62 which is also twisted to contribute to the rotary force imparted to the device by the action of water incident thereupon, and centrally of the cross bar 62 a bolt 44 is mounted, carrying washers 45, as in Figures 5 and 7.

Figure 9:
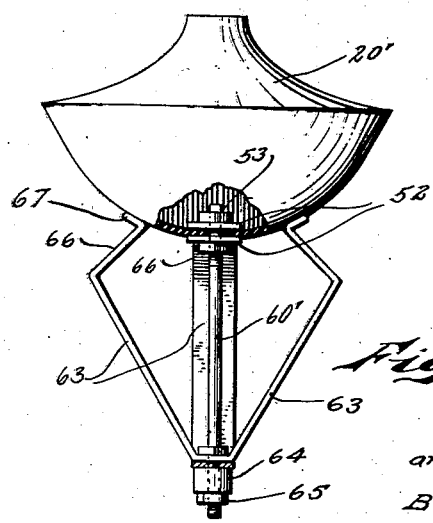
Figure 9 is an elevation partly in section, of a still further modification, applied to a conventional valve having an extremely small aperture.

In Figure 9 a stem 60', corresponding to the one 60 last mentioned, is shown engaged with the valve 20', which in the present instance has a very small opening in its lower part. Washers 52 and nuts 53 are shown in operative engagement with the ball, and adjustably mounted on the lower end of the stem 60', there are two bow spring devices 63, these being apertured and having a stem inserted therethrough and projected a distance below. On the lower projected portion of the stem, a weight element 64 is removably engaged, held by a nut 65 engaged on the lower threaded extremity of the stem. The springs 63 comprise upwardly extended rectilinear and divergent arms, their upper parts being bent inwardly as at 66, approximately normal to the adjacent surface of the ball, and the extremities of these arms then bent laterally to afford foot portions 67 which lie flat against the surface of the ball, or closely adjacent thereto. The lower, upwardly divergent portions of the arms comprise the major part of the length of the arms, each of the bow spring devices being substantially V-shaped. They thereby function well as a guide for the valve 20' when the latter moves downwardly into a fitting 11, the angles 66 at the upper ends of the arms 63 fitting loosely within the port fitting 11, so as to guide the valve properly to its seat without impeding its movement.

It should be understood that the form shown in Figure 9 can be employed upon tank balls having a large opening, in which case the washers 52 and 53 are omitted, and securement of the device effected by compressing the spring devices 63 until they may be inserted in the opening of the ball. Upon release of pressure upon the spring devices 63, the springs will move outwardly so as to engage the rim of the opening of the ball with such force as to positively hold the guide and ball together.

The wire form devices may be made in suitable sizes to accommodate the device to different sizes of outlet ports, but it has been found that one size functions well with the usual range of diameters in the seat 12 and outlet ports, so that special sizes will not be required in ordinary practice. Thus, a device adapted for use with a two-inch outlet port will have a clearance of approximately one-eighth of an inch, and it will also function satisfactorily with two-and-a-half inch port, as the greater clearances do not impair the proper functioning of the device.

It will be understood that while we have shown a specific embodiment of the invention in the present disclosure, this is nevertheless purely exemplary, and various changes in form and construction may be made within the spirit of the invention without departing from the spirit of the invention or extended beyond the scope of the appended claims.

We claim:

1. An attachable guide device of the character described, comprising a wire bent at its middle to form two helical guide elements, the outer end portions of the wire being bent to form two concentric, annular elements adapted to receive therebetween the edge portions of a valve opening in a valve of the general character indicated, said two end portions of the wire being shaped and under stress tending to support said two annular elements together.

2. The structure of claim 1, in which one end portion of the wire above its helix is bent to form a rectilinear coaxial stem portion, its outer end being bent to form a ring concentric with the stem, the other end portion of the wire being bent to form an eye slidable on said stem and its outer end portion being shaped to form a ring concentric with the stem, whereby the inherent stress of the wire will cause the two rings to press toward each other.

3. An attachable guide device of the character described, comprising a wire bent at its middle to form two helical guide elements, the outer end portions of the wire each having an annular member arranged in concentric relation, one of the annular members being shaped and under stress tending to draw said annular members together.

4. An attachable guide device of the character described, comprising a pair of connected elongated helical guide elements movable longitudinally relatively to one another, said guide elements having an annular member at their ends arranged in concentric relation, one of the annular members being insertable through the opening of a valve, and said guide elements being shaped and under stress tending to draw said annular members into clamping engagement with one another.

GEORGE LAWSON ROBERTSON.
VLON NEILAN MORRIS.